United States Patent [19]

Mochizuki et al.

[11] Patent Number: 5,739,812
[45] Date of Patent: Apr. 14, 1998

[54] SYSTEM FOR INPUTTING IMAGE AND COMMOND USING THREE-DIMENSIONAL MOUSE CAPABLE OF GENERATING, IN REAL TIME, THREE-DIMENSIONAL IMAGE

[75] Inventors: Takayasu Mochizuki, Tokyo, Japan; Tetsuo Gotoh, Saratoga, Calif.

[73] Assignee: Cipher Co. Ltd., Tokyo, Japan

[21] Appl. No.: 695,867

[22] Filed: Aug. 9, 1996

[30] Foreign Application Priority Data

Jul. 18, 1996 [JP] Japan ................ 8-189697

[51] Int. Cl.$^6$ .................................. G09G 5/08
[52] U.S. Cl. .............................. 345/163; 348/40
[58] Field of Search ............... 348/40, 41; 395/119; 359/1, 9, 23, 33, 35; 430/1, 2; 356/347; 345/163, 156, 158, 166

[56] References Cited

U.S. PATENT DOCUMENTS

| | | | |
|---|---|---|---|
| 3,735,036 | 5/1973 | Macovski | 348/40 |
| 4,745,402 | 5/1988 | Auerbach | 345/158 |
| 4,754,268 | 6/1988 | Mori | 345/158 |
| 5,132,212 | 7/1992 | Iwaki et al. | 348/40 |
| 5,172,251 | 12/1992 | Benton et al. | 384/40 |

*Primary Examiner*—Doon Chow
*Attorney, Agent, or Firm*—Helfgott & Karas, P.C.

[57] ABSTRACT

In a system for inputting image and command using a three-dimensional mouse, a transmitting dipole antenna (13) is movable in an out side real space which responds to a virtual space to radiate an electromagnetic wave. A radiation controlling switch (15) controls the transmitting dipole antenna to radiate the electromagnetic wave. A hologram data collecting circuit (17) receives the electromagnetic wave and collectes hologram data in response to the electromagnetic wave. A data processing unit (18) operates an expression in response to the hologram data to produce an image in the virtual space that responds to the transmitting dipole antenna. The expression defines an analogous expression which represents an analogous intensity of a wave which is generated by the hologram data. A movement distance operating unit (19) operates a movement distance of the transmitting dipole antenna while the transmitting dipole antenna radiates the electromagnetic wave.

9 Claims, 7 Drawing Sheets

SYSTEM FOR INPUTTING IMAGE AND COMMOND USING THREE-DIMENSIONAL MOUSE CAPABLE OF GENERATING, IN REAL TIME, THREE-DIMENSIONAL IMAGE

FIELD OF THE INVENTION

The invention relates to a system for inputting image and command using a three-dimensional mouse, and more particularly, to a system which is capable of generating, in a real time, a three-dimensional image.

BACKGROUND OF THE INVENTION

A first conventional system comprises a plane table, a mouse inputting member, a host computer, and a display unit. The mouse inputting member has a command inputting switch and is movable. When the mouse inputting member is moved on the plane table, an arrow mark is moved in response to movement of the mouse inputting member on the image plane of the display unit. The command inputting switch is capable of inputting the command signal to the host computer.

A second conventional system comprises four strings which are tied at a tied point and four length measuring machines. The four strings receives tensions. When the tied point is moved by a fingertip, the four length measuring machines measure lengths of the four strings. Thus, the second conventional system is capable of inputting three-dimensional coordinate of the tied point. The second conventional system is disclosed in the SINGAKUSI J74-D-11, 7, PP 887–894, July, 1991, "proposal of space interface unit SPIDAR" of Sato et al.

A third conventional system of a computer graphics comprises a CAD software for generating a three-dimensional image.

A fourth conventional system comprises a three-dimensional accelerometer and an integrator which integrates an output of the three-dimensional accelerometer by a time to measure a three-dimensional coordinate.

A fifth conventional system of a computer hologram comprises a wave surface operating unit which operates a wave surface of a reflected wave from an object.

However, the first conventional system is incapable of inputting the three-dimensional image. The second through fifth conventional system are hardly capable of generating, in a real time, a three-dimensional image.

SUMMARY OF THE INVENTION

Accordingly, it is an object of the invention to provide a system which is capable of generating, in a real time, a three-dimensional image.

Other objects of the invention will become clear as the description proceeds.

According to an aspect of the invention, there is provided a system for inputting image and command using a three-dimensional mouse, the system comprising:

a mouse inputting member movable in an outside real space which responds to a virtual space, the mouse inputting member being for radiating a radiation wave which comprises one of an electromagnetic wave, an acoustic wave, and an ultrasonic wave;

a radiation controlling switch connected to the mouse inputting member for controlling the mouse inputting member to radiate the radiation wave;

hologram data collecting means received the radiation wave for collecting hologram data in response to the radiation wave;

data processing means connected to the hologram data collecting means for operating an expression in response to the hologram data to produce an image in the virtual space that responds to the mouse inputting member, the expression defining an analogous expression which represents an analogous intensity of a wave which is generated by the hologram data; and movement distance operating means connected between the radiation controlling switch and the data processing means for operating a movement distance of the mouse inputting member while the radiation controlling switch controls the mouse inputting member to radiate the radiation wave.

According to another aspect of the invention, there is provided a system for inputting image and command, the system comprising:

a radiating point source movable in an outside real space which responds to a virtual space, the radiating point source being for radiating a radiation wave which comprises one of an electromagnetic wave, an acoustic wave, and an ultrasonic wave;

a radiation controlling switch connected to the radiating point source for controlling the radiating point source to radiate the radiation wave;

hologram data collecting means received the radiation wave for collecting hologram data in response to the radiation wave;

data processing means connected to the hologram data collecting means for operating an expression in response to the hologram data to produce an image in the virtual space that responds to the radiating point source, the expression defining an analogous expression which represents an analogous intensity of a wave which is generated by the hologram data;

movement distance operating means connected between the radiation controlling switch and the data processing means for operating a movement distance of the radiating point source while the radiation controlling switch controls the radiating point source to radiate the radiation wave;

a command inputting unit connected to the data processing means for inputting command signals to the data processing means, the command signals being for making the data processing means operate; and a stereoscopic unit connected to the data processing means for displaying the image in the virtual space from the data processing means.

BRIEF DESCRIPTION OF THE DRAWINGS

The invention will be explained in more detail in conjunction with appended drawings, wherein.

DESCRIPTION OF THE PREFERRED EMBODIMENTS

Before explaining a system in the preferred embodiment according to the invention, the aforementioned conventional systems will be explained in FIGS. 1 and 2.

Figure 1:
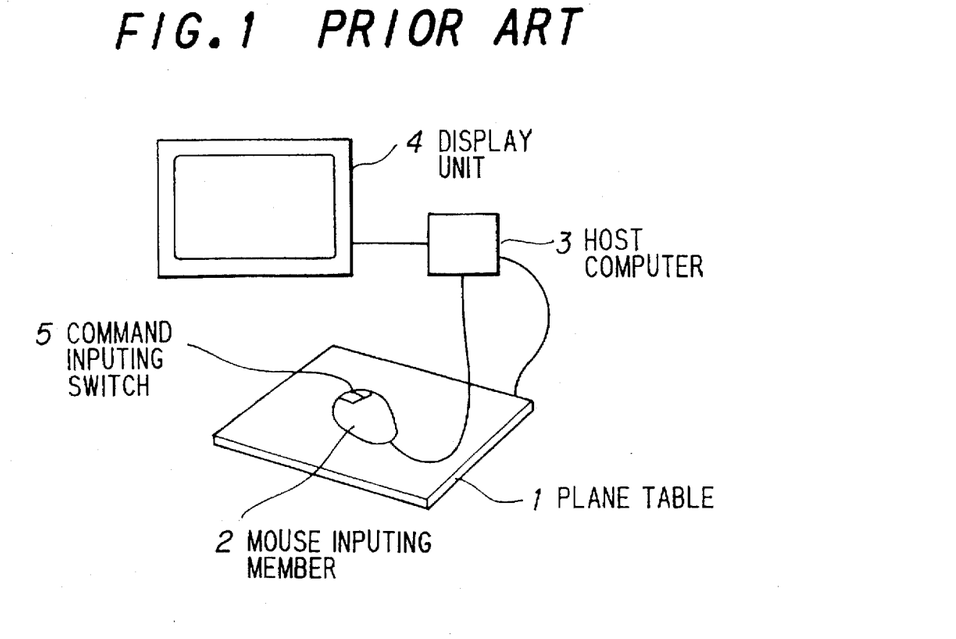
FIG. 1 is a schematic view of a first conventional system.

FIG. 1 shows the first conventional system which comprises the plane table 1, the mouse inputting member 2, the host computer 3, and the display unit 4. The plane table 1, the mouse inputting member 2, and the display unit 4 are connected to the host computer 3. The mouse inputting member 2 has a command inputting switch 5 and is movable. When the mouse inputting member 5 is moved on the plane table 1, an arrow mark is moved in response to the movement of the mouse inputting member 2 on the image plane of the display unit 4. The command inputting switch 5 is capable of inputting the command signals to the host computer 3.

Figure 2:
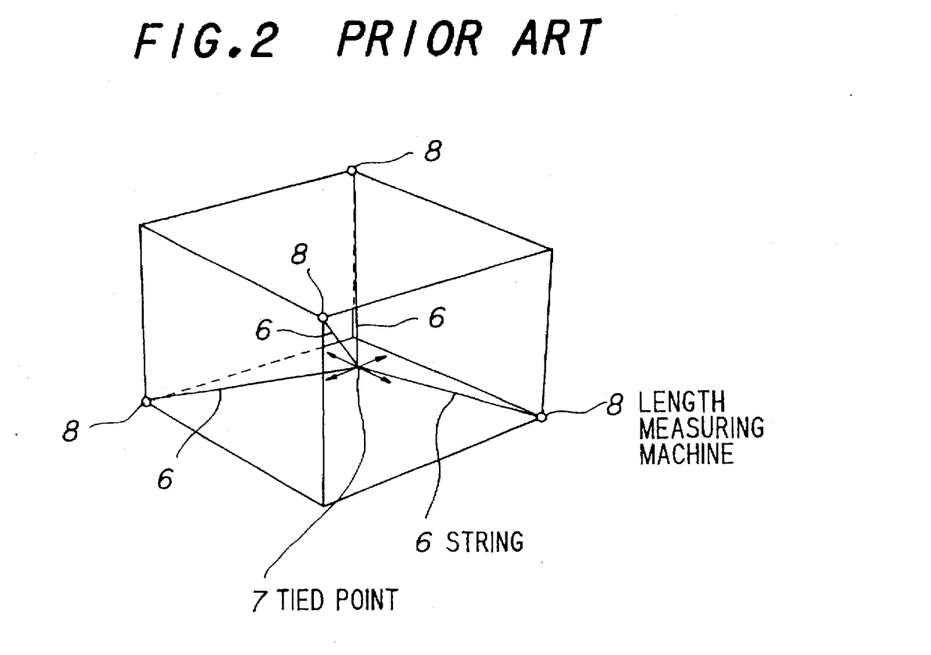
FIG. 2 is a schematic view of a second conventional system.

FIG. 2 shows the second conventional system which comprises the four strings 6 which are tied at a tied point 7 and the four length measuring machines 8. The four strings 6 receives the tensions. When the tied point 7 is moved by the fingertip, the four length measuring machines 8 measure the length of the four strings 6. Thus, the second conventional system is capable of inputting the three-dimensional coordinate of the tied point 7.

However, the first conventional system is incapable of inputting the three-dimensional image. Inasmuch as, in the second conventional system, the velocity of movement of the tied point 7 is limited because it needs to maintain the tensions of the strings 6, it is hardly possible to generate, in a real time, the three-dimensional image. Also, in the second conventional system, it is hardly possible to change the size of the system.

Referring to FIGS. 3, 4, 5, 6, 7, and 8, the description will proceed to a system according to an embodiment of the invention.

Figure 3:
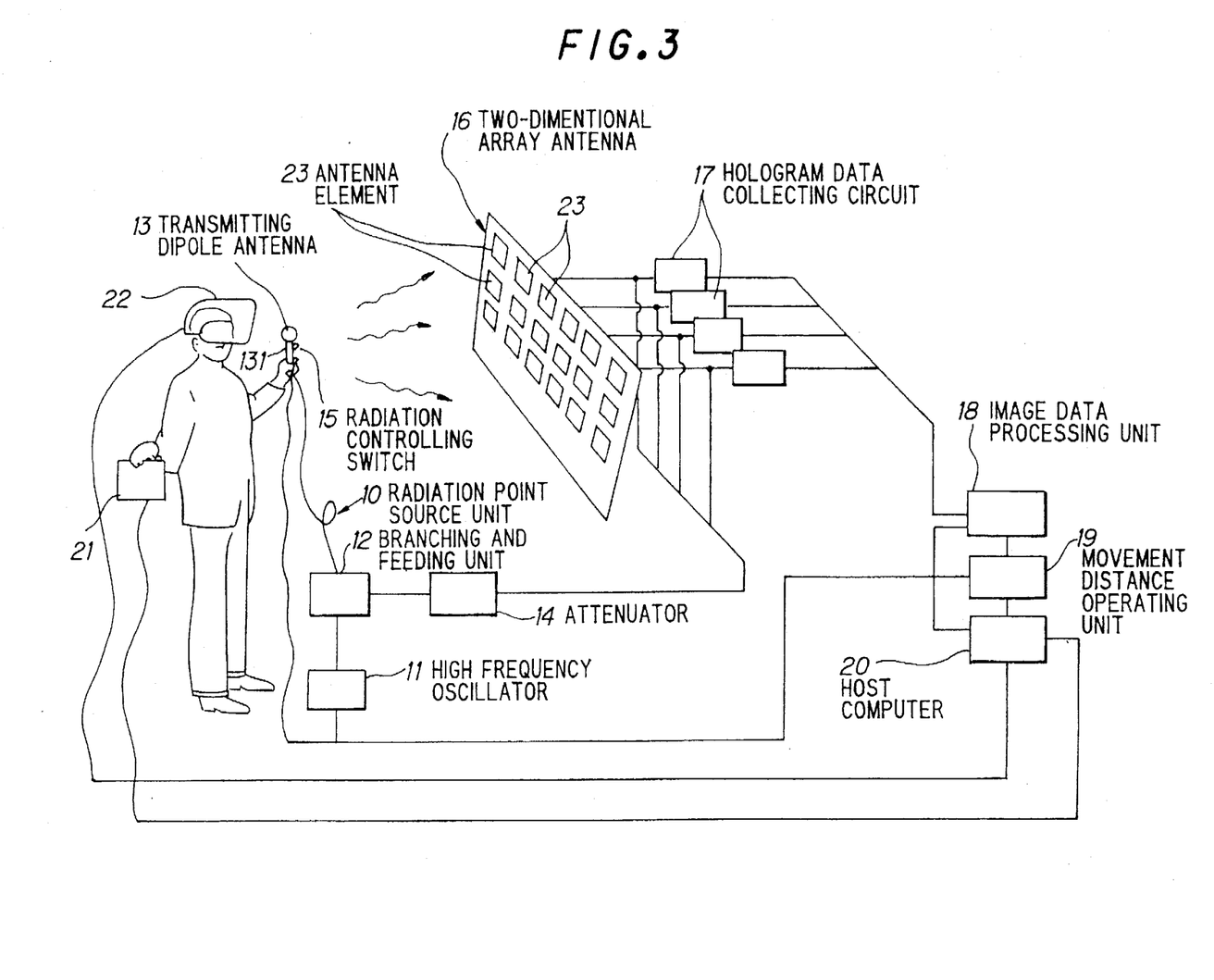
FIG. 3 is a schematic view of a three-dimensional system according to an embodiment of the invention.

In FIG. 3, the system comprises a radiation source unit 10 which comprises a high frequency oscillator 11, a branching and feeding unit 12, a transmitting dipole antenna 13, and an attenuator 14.

The system further comprises a radiation controlling switch 15, a two-dimensional array antenna 16, a hologram data collecting circuit 17, a image data processing unit 18, a movement distance operating unit 19, a host computer 20, a command inputting unit 21, and a stereoscopic unit 22.

The high frequency oscillator 11 is connected to the branching and feeding unit 12. The branching and feeding unit 12 is connected to the transmitting dipole antenna 13 and the attenuator 14 through transmission lines such as coaxial lines. The radiation controlling switch 15 is connected to the high frequency oscillator 11 and the movement distance operating unit 19 through the transmission lines. The hologram data collecting circuit 17 is connected among the two-dimensional array antenna 16, the attenuator 14, and the image data processing unit 18 through transmission lines. The movement distance operating unit 19 is connected to the image data processing unit 18 and the host computer 20 through transmission lines. The host computer 20 is connected among the image data processing unit 18, the command inputting unit 21, and the stereoscopic unit 22 through transmission lines.

The high frequency oscillator 11 produces a high frequency signal to supply the high frequency signal to the branching and feeding unit 12. The radiation controlling switch 15 controls the high frequency oscillator 11 to produces a high frequency signal. Namely, when the radiation controlling switch 15 is switched on by an operator, the radiation controlling switch 15 produces and supplies a radiation control signal to the high frequency oscillator 11.

The high frequency oscillator 11 radiates the high frequency signal while the high frequency oscillator 11 is supplied with the radiation control signal from the radiation controlling switch 15. As a result, the radiation controlling switch 15 controls the transmitting dipole antenna 13 to radiate a radiation wave which comprise an electromagnetic wave which cause holograms. Also, the radiation controlling switch 15 supplies the radiation control signal to the movement distance operating unit 19.

The branching and feeding unit 12 is supplied with the high frequency signal from the high frequency oscillator 11 and branches the high frequency signal to produce a first branched high frequency signal and a second branched high frequency signal. The branching and feeding unit 12 supplies the first branched high frequency signal to the transmitting dipole antenna 13 and supplies the second branched high frequency signal, as a reference wave signal, to the attenuator 14. The attenuator 14 is supplied with the reference wave signal from the branching and feeding unit 12 and attenuates the reference wave signal to send the the reference wave signal to the hologram data collecting circuit 17. The transmitting dipole antenna 13 is supplied with first branched high frequency signal from the branching and feeding unit 12 to radiate, as a radiating point source, the electromagnetic radiation wave which cause holograms.

A holder of the transmitting dipole antenna 13 is held by a hand of an operator. The transmitting dipole antenna 13 is movable in three-dimensional directions in an outside real space which responds to a virtual space which is produced by the system. The radiation controlling switch 15 is attached to the holder of the transmitting dipole antenna 13. In addition, the system may comprise a mouse inputting member having the transmitting dipole antenna 13. The mouse inputting member is held by a hand of the operator. The mouse inputting member is movable in the three-dimensional directions in the outside real space which responds to the virtual space.

Figure 4:
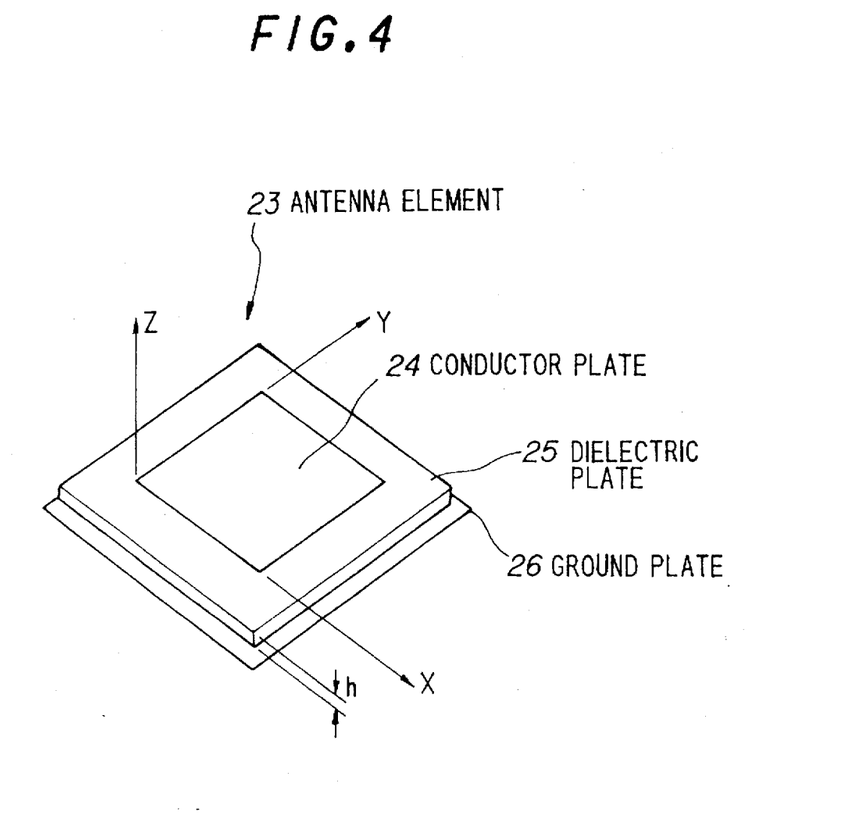
FIG. 4 is a perspective view of an antenna element of the system illustrated in FIG. 3.

The two-dimensional array antenna 16 comprises a plurality of antenna elements 23 which are positioned in a matrix form. As shown in FIG. 4, each of the antenna elements 23 comprises a conductor plate 24, a dielectric plate 25, and a ground plate 26. The conductor plate 24 is a rectagle patch plate. The antenna element 23 is called a microstrip antenna element. Each of the antenna elements 23 may has a size of about 1/n of a wavelength of the electromagnetic wave where n represents few integral numerals. Inasmuch as the two-dimensional array antenna 16 is capable of receiving the electromagnetic wave which has a wide frequency range of 100 MHz to 50 GHz, it is possible to unlimitedly select a frequency of the hologram. Also, a size of the two-dimensional array antenna 16 is not limited. When a feed point of a receiving signal in the two-dimensional array antenna 16 changes, it is possible to select a direction of a polarized wave of the receiving signal. The size of the two-dimensional array antenna 16 is substantially equal to a size of a three-dimensional object, namely, a space in which the transmitting dipole antenna 13 is moved. The antenna elements 23 of the two-dimensional array antenna 16 are supplied with the electromagnetic wave which is transmitted in the air from the transmitting dipole antenna 13 to produce and send the electromagnetic radiation signal to the hologram data collecting circuit 17.

The hologram data collecting circuit 17 is supplied with the electromagnetic radiation signal and the reference wave signal from the attenuator 14, and adds and combines the electromagnetic radiation signal and the reference wave signal to produce a combined electromagnetic radiation signal. In addition, the hologram data collecting circuit 17 detects and amplifies the combined electromagnetic radiation signal to convert the combined electromagnetic radiation signal into a digital electromagnetic radiation signal. The digital electromagnetic radiation signal is a discrete two-dimensional hologram data which represent an intensity and a phase of the electromagnetic radiation wave which is supplied from the antenna elements 23 of the two-dimensional array antenna 16. The hologram data collecting circuit 17 supplies the discrete two-dimensional hologram data to the image data processing unit 18.

The image data processing unit 18 is supplied with the discrete two-dimensional hologram data and memorizes the discrete two-dimensional hologram data in a memory unit (not shown). The image data processing unit 18 holds data of operation expressions and numerical tables. The image data processing unit 18 operates, in a real time, the operation expressions based on the discrete two-dimensional hologram data and the data of the numerical tables to produce a three-dimensional image data as will be later described. The image data processing unit 18 supplies the three-dimensional image data to the movement distance operating unit 19 and the host computer 20.

While the movement distance operating unit 19 is supplied with the radiation control signal from the radiation controlling switch 15 and the three-dimensional image data from the image data processing unit 18, the movement distance operating unit 19 operates a movement distance of the transmitting dipole antenna 13.

The command inputting unit 21 is for inputting command signals to the host computer 20. Namely, the command signals are inputted by the operator by use of the command inputting unit 21. The command inputting unit 21 is held by the hand of the operator.

The command inputting unit 21 may be for inputting command signals to the host computer 20 through the image data processing unit 18. When the command inputting unit 21 inputs the command signals to the host computer 20, the host computer 20 produces a point image data and a line image data representing a locus which is obtained when the transmitting dipole antenna 13 is moved. Also, when the command inputting unit 21 inputs the command signals to the host computer 20, the host computer 20 produces and modifies the three-dimensional image data. The stereoscopic unit 22 is mounted on a head of the operator. The stereoscopic unit 22 displays a point image, a line image, a three-dimensional image in response to the point image data, the line image data, the three-dimensional image data from the host computer 20.

Next, the operation of the image data processing unit will be described in detail.

An output (I($\xi$, $\eta$)=I$\alpha$) of the hologram data collecting circuit 15 are ordinarily represented by a following expression (1). I ($\xi$, $\eta$)=I$\alpha$ represents a pattern of an inference fringe which is made by the reference wave and a calling wave or a reflection wave from a three-dimensional object when a coordinate value of a form of the three-dimensional object is represented by Aj=(x,y,z) in a three-dimensional holography which uses one of the electromagnetic wave, an acoustic wave, and an ultrasonic wave which are coherent.

$$I\alpha = \left[\sum_j \frac{Aj}{R\alpha j} \exp(ikR\alpha j) + 1\right]\left[\sum_m \frac{Am}{R\alpha m} \exp(-ikR\alpha m) + 1\right] \quad (1)$$

$$= 2\sum_j \frac{Aj}{R\alpha j} \cos(kR\alpha j) + 1 + O[(A/R)^2]$$

In the expression (1), ($\xi$, $\eta$) represents a coordinate on a surface of the hologram, $\alpha$ represents a position of a point on the surface of the hologram, j and m represent a three-dimensional coordinate point of an object in a real space, k represents a wave number of the electromagnetic radiation wave, exp (ikR$\alpha$ j)/R$\alpha$ j represents a transmission of a spherical wave which reaches from a j point to a $\alpha$ point, "1" represents an amplitude of the reference wave. Inasmuch as a term represents a phase of the reference wave is constant, the term is omitted. In the expression (1), O[(A/R)2 ] represents a numerical value which has an order of [(A/R)2 ], A represents an intensity of the calling wave or the reflection wave from the three-dimensional object when an intensity of the reference wave is equal to 1. When R is sufficiently great, a first term has an order of A/R, O[(A/R)2 ] ordinarily has a small order which is disregarded.

A distance (Rj$\alpha$) between the j point and the $\alpha$ point of the object is represented by a following expression (2).

$$Rj\alpha = R\alpha j \equiv R(x, y, z; \xi, \eta) = [(x-\xi)^2 + (y-\eta)^2 + z^2]^{1/2} \quad (2)$$

Next, when the image is regenerated, a wave which is regenerated from the hologram has a intensity (Wi) of the wave at an observation point in a virtual space. Wi is represented by a following expression (3).

$$Wi = \left|\sum_\alpha I\alpha \exp(-ikR\alpha i)/R\alpha i\right|^2 \quad (3)$$

In the conventional computer holography, the image is regenerated by operating based on the expression (3). However, inasmuch as operation of the expression (3) is compricated, operation of the expression (3) needs a computer which has a very high speed and a large capacity.

An intensity ($\phi$ i) of the wave that is analogous to the intensity (Wi) is represented by a following expression (4).

$$\phi i = \sum_\alpha I\alpha \cos(kRi\alpha)/Ri\alpha \quad (4)$$

In the expression (4)

$$\sum_\alpha$$

represents to carry out a sum in all lattice points of the surface of the hologram.

A following expression (5) is given by substituting the expression (1) for the expression (4)

$$\phi i = 2\sum_j \sum_\alpha \frac{Aj}{R\alpha j Ri\alpha} \cos(kR\alpha j)\cos(kRi\alpha) + \sum_\alpha \frac{\cos(kRi\alpha)}{Ri\alpha} \quad (5)$$

Inasmuch as a trigonometric function positively and negatively oscillates together with a variable, each of terms of integral in the expression (5) contributes to a whole numerical value, namely, $\phi$ i only when j is equal to i. Therefore, $\phi$ i is represented by a following expression (6).

$$\phi i = C \cdot A i + D \quad (6)$$

In the expression (6), C is represented by a following expression (7).

$$C = 2 \sum_{\alpha} \cos^2(kRi\alpha)/(Ri\alpha)^2 \tag{7}$$

Also, in the expression (6), D is represented by a following expression (8).

$$D = \sum_{\alpha} \cos(kRi\alpha)/Ri\alpha \tag{8}$$

In the expressions (6), (7), and (8), inasmuch as cos2 (kRiα) has a positive value and a sum total of cos2 (kRiα) at whole different α slightly depends on positions of i, C slightly depends on i. On the other hand, cos(kRiα) positively and negatively changes together with kR when kR is sufficiently greater than 1. As a result, D is a small value which is disregarded. Therefore, it is distingushed that φ i is analogous to Wi, namely, the expression (4) is analogous to the expression (3).

Accordingly, the image data processing unit operates the expression (4) to produce the three-dimensional data. When the image data processing unit 18 operates in parallel the expression (4), a speed operation of the expression (4) become greater.

The image data processing unit has a pipeline construction. When the image data processing unit 18 is supplied with data of position (xi ,yi ,zi) of regeneration point, the image data processing unit 18 operates by steps shown in FIG. 5.

Figure 5:
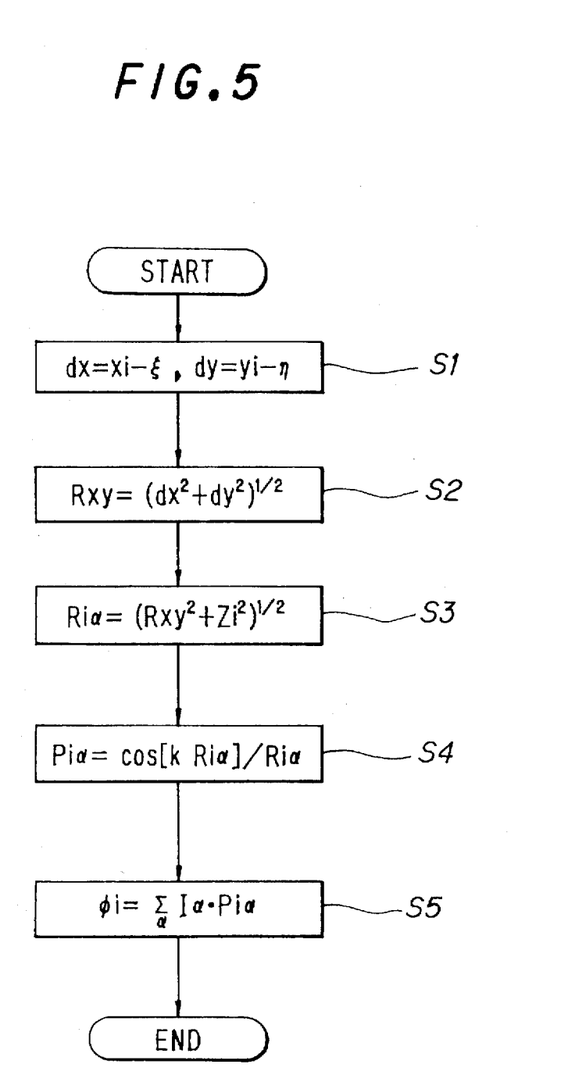
FIG. 5 is a flow chart for use in describing operation of the system illustrated in FIG. 3.

At a step S1, the image data processing unit 18 operates dx=x1 - ξ and dy=y1 - η. Next, at a step S2, the image data processing unit 18 operates Rxy=(dx2+dy2)½. Next, at a step S3, the image data processing unit operates Ri α=(Rxy2+Zi2)½.

Next, at a step S4, the image data processing unit 18 operates Pi α=cos [kRiα] /Riα. Next, at a step S5, the image data processing unit 18 operates φ

$$i = \sum_{\alpha} I \alpha \, Pi\alpha.$$

Figure 6:
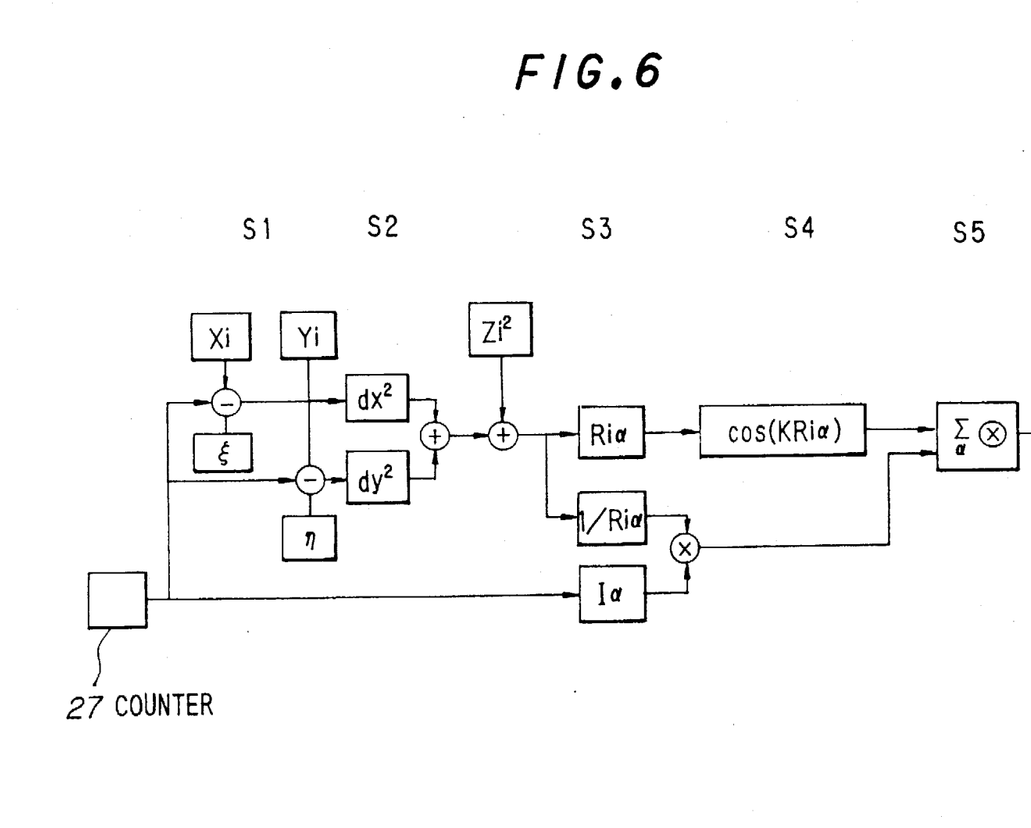
FIG. 6 is a block diagram for use in describing operation of the system illustrated in FIG. 3.

FIG. 6 shows a blok diagram for explaining the operation of the steps S1 to S5 shown in GIG. 5. A counter 27 is operated by command signal from the host computer 20. When the counter 27 counts 1 to m as regards i and 1 to n as regards α, the image data processing unit 18 operates the expression (4), where m represents number of lattice points of a image regeneration space and n represents number of lattice points of the surface of the hologram (surface of the two-dimensional array antenna 16).

The image data processing unit 18 has numeric tables which are written in a ROM chip. One of the numeric tables is a numeric table of a trigonometric function. The operation of the steps S1 to S4 is carried out by reading the numeric tables which are written in a ROM chip. In the operation of trigonometric function, cos(kRiα) is operated based on the numeric tables of the trigonometric function when kRiα is determined. When the image data processing unit 18 uses the numeric table of the trigonometric function, operation speed of the image data processing unit 18 is higher than that of the convention unit by about 240 times.

Next, in the step S4, the image data processing unit 18 may use Piα which is defined by a following expression (9).

$$Pi\alpha = \begin{cases} 0 (\cos(kRi\alpha) < 0.5 \\ 1/Ri\alpha (\cos(kRi\alpha) \geq 0.5 \end{cases} \tag{9}$$

In this event, the image data processing unit 18 may use cos (kRiα) which is defined by a following expression (10).

$$\cos(kRi\alpha) = \begin{cases} 0 (\cos(kRi\alpha) < 0.5 \\ 1 (\cos(kRi\alpha) \geq 0.5 \end{cases} \tag{10}$$

When the image data processing unit 18 uses Pi α and cos (kRiα) which are defined by the expressions (9) and (10), the operation speed of the image data processing unit 18 becomes higher.

Next, the description will be made as regards a concrete embodiment of operation time period which is requested to generate the three-dimensional image.

When the hologram data has 100×100, a time period which is requested to obtain one of φ i is equal to (100× 100+5) t pipe, where 5 represents a number of steps of pipelines and t pipe represents a clock period. When the image data processing unit 18 uses a clock signal which has a clock frequency of 33 MHz, the time period which is requested to obtain one of φ i is 1×10–4 second because t pipe is equal to 3×10–8.

Inasmuch as a practical image generation space has the lattice points of about 100×100×100, the time period which is requested to obtain whole of φ i is equal to about 300 second. When the image data processing unit 18 comprises one hundred CPUs which are connected in parallel, the time period which is requested to obtain whole of φ i is equal to about 3 second. Inasmuch as a image to be generated is a image of a point, it is not necessary to operate whole of φ i. Therefore, the image data processing unit 18 is capable of generating a image in about 1 and less second, namely, in a real time.

Figures 7, 7A, 7B, 7C:
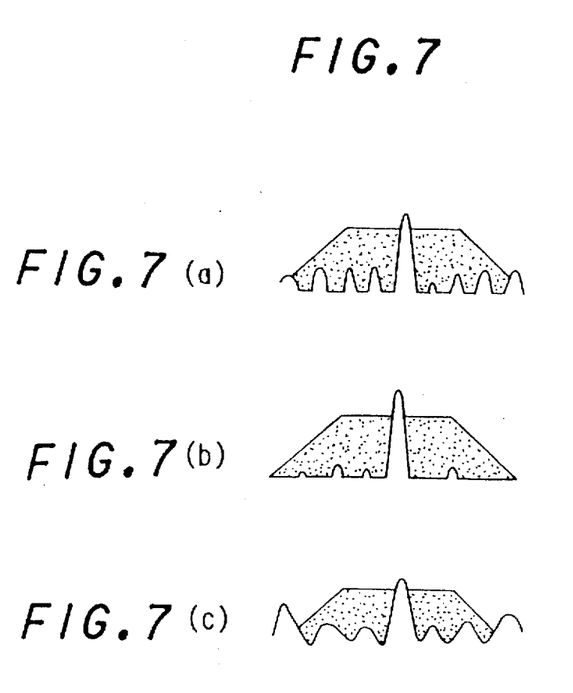
FIG. 7 is a view for use in describing a image which is generated by the system illustrated in FIG. 3.

Referring to FIG. 7, the description will be made as regards a concrete embodiment of a image which is generated.

FIG. 7 shows the image which is generated when the transmitting dipole antenna 13 radiates the electromagnetic wave which has a frequency of 0.75 GHz and when the two-dimensional array antenna 14 has a size of 250×120 cm and antenna elements 21 each of which has a size of 12×12 cm. A vertical axis represents a intensity of the image. A horizontal axis represents a space distance which is parallel to a surface of the two-dimensional array antenna 14. Small wave crests rep resent noises. A central crest represents a position of the transmitting dipole antenna 13. FIGS. 7(a), 7(b), and 7(c) represent the image when distances between the transmitting dipole antenna 13 and the surface of the two-dimensional array antenna 16 are equal to 40 cm, 57 cm, and 76 cm. Combination of the transmitting dipole antenna 13, the radiation controlling switch 15, and the command inputting unit 21 serves as a head of a mouse inputting unit having the mouse inputting member.

Figure 8:
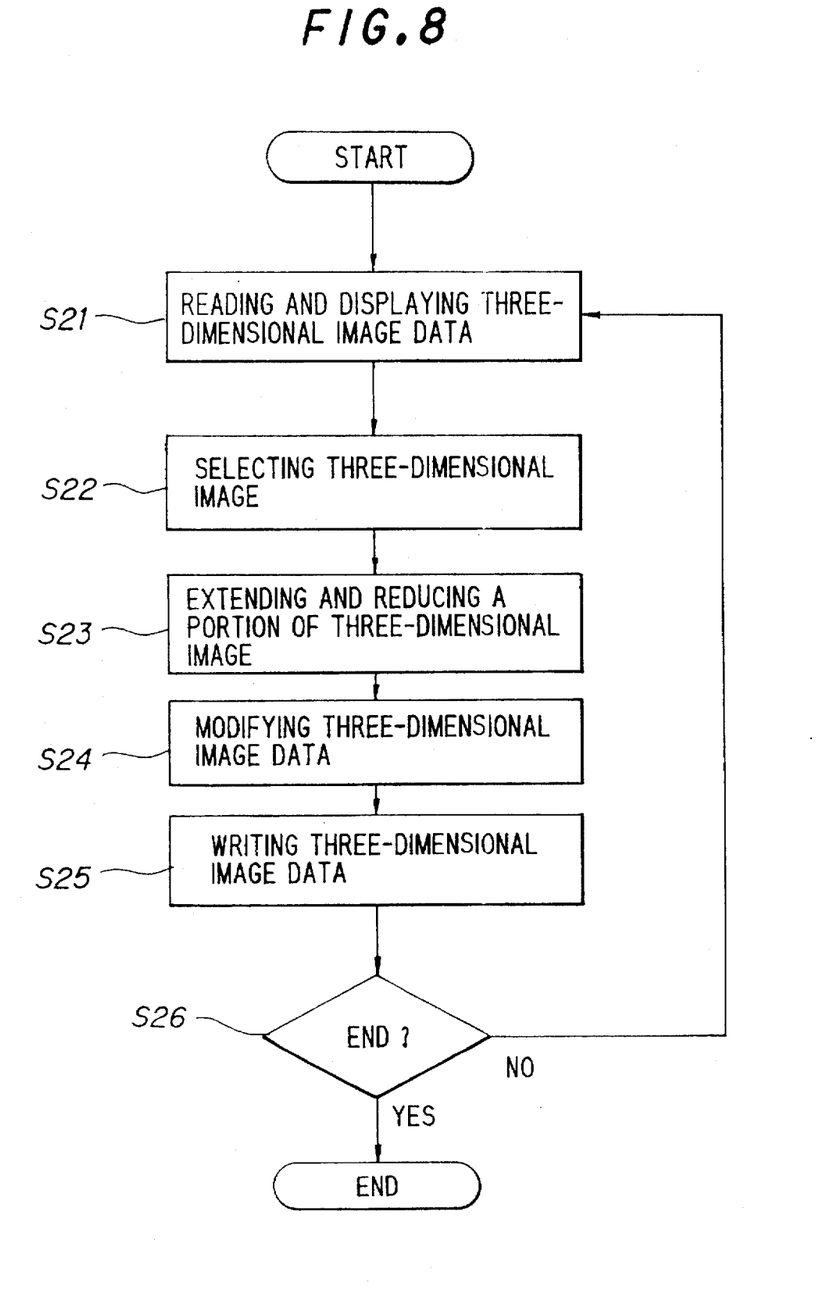
FIG. 8 is another flow chart for use in describing operation of the system illustrated in FIG. 3.

Referring to FIG. 8, the description will be made as regards a concrete embodiment of operation of the system.

At a step S21, the system carries out to read and display the three-dimensional image data from the host computer 20 when is supplied with the command signals from the command inputting unit 21. Next, at a step S22, the system carries out to select the three-dimensional image data when is supplied with the command signals from the command inputting unit 21. Next, at a step S23, the system carries out to extend and reduce a portion of the three-dimensional image data when is supplied with the command signals from the command inputting unit 21. Next, at a step S24, the system carries out to modify a portion of the three-dimensional image data when is supplied with the command signals from the command inputting unit 21. Next, at a step S25, the system carries out to write the three-dimensional image data to the host computer when is supplied with the command signals from the command inputting unit 21. Next, at a step S26, the system judges whether or not operation ends. When the operation of the system does not end, the system returns to the step S1.

The system can access whole points of the virtual space. If a holography space is filled by a moderate viscous liquid, the system can input reliable data.

The invention is applied to a image of nuclear magnetic resonance as regards a human brain and stereo piping diagrams as regards a city gas, a water line, and a chemicals factory.

While the invention has thus far been described in conjunction with a single embodiment thereof, it will readily be possible for those skilled in the art to put the invention into practice in various other manners. For example, the attenuator 14 may be omitted. The system may comprise the radiation point source which radiates the radiation wave which comprises one of an acoustic wave and ultrasonic wave. The radiation point source comprises a piezoelectric element. In this event, the system comprises a two-dimensional array microphone instead of the two-dimensional array antenna 16.

What is claimed is:

1. A system for inputting image and command using a three-dimensional mouse, said system comprising:
   a mouse inputting member movable in an outside real space which responds to a virtual space, said mouse inputting member being for radiating a radiation wave which comprises one of an electromagnetic wave, an acoustic wave, and an ultrasonic wave;
   a radiation controlling switch connected to said mouse inputting member for controlling said mouse inputting member to radiate said radiation wave;
   hologram data collecting means for collecting hologram data in response to said radiation wave;
   data processing means connected to said hologram data collecting means for operating an expression in response to said hologram data to produce an image in said virtual space that responds to said mouse inputting member, said expression defining an analogous expression which represents an analogous intensity of a wave which is generated by said hologram data; and
   movement distance operating means connected between said radiation controlling switch and said data processing means for operating a movement distance of said mouse inputting member while said radiation controlling switch controls said mouse inputting member to radiate said radiation wave.

2. A system as claimed in the claim 1, wherein said data processing means has a numeric table of a trigonometoric function, said data processing means being for operating said expression in response to said hologram data and said numeric table of said trigonometoric function.

3. A system for inputting image and command, said system comprising:
   a radiating point source movable in an outside real space which responds to a virtual space, said radiating point source being for radiating a radiation wave which comprises one of an electromagnetic wave, an acoustic wave, and an ultrasonic wave;
   a radiation controlling switch connected to said radiating point source for controlling said radiating point source to radiate said radiation wave;
   hologram data collecting means received said radiation wave for collecting hologram data in response to said radiation wave;
   data processing means connected to said hologram data collecting means for operating an expression in response to said hologram data to produce an image in said virtual space that responds to said radiating point source, said expression defining an analogous expression which represents an analogous intensity of a wave which is generated by said hologram data;
   movement distance operating means connected between said radiation controlling switch and said data processing means for operating a movement distance of said radiating point source while said radiation controlling switch controls said radiating point source to radiate said radiation wave;
   a command inputting unit connected to said data processing means for inputting command signals to said data processing means, said command signals being for making said data processing means operate; and
   a stereoscopic unit connected to said data processing means for displaying said image in said virtual space from said data processing means.

4. A system as claimed in the claim 3, wherein said data processing means has a numeric table of a trigonometoric function, said data processing means being for operating said expression in response to said hologram data and said numeric table of said trigonometoric function.

5. A system as claimed in one of the claims 3, wherein said radiating point source radiates said radiation wave which comprises said electromagnetic wave, said system further comprising a radiating source unit which comprises said radiating point source, a high frequency oscillator, and a branching and feeding unit,
   said high frequency oscillator connected to said branching and feeding unit for producing a high frequency signal to supply said high frequency signal to said branching and feeding unit,
   said branching and feeding unit connected to said radiating point source and said hologram data collecting means for branching said high frequency signal from said high frequency oscillator and producing first and second high frequency signals to supply said first high frequency signal to said radiating point source and to supply said second high frequency signal, as a reference wave, to said hologram data collecting means;
   said hologram data collecting means received said radiation wave and said reference wave for collecting hologram data in response to said radiation wave and said reference wave.

6. A system as claimed in the claim 5, wherein said hologram data collecting means comprises a two-dimensional array antenna.

7. A system as claimed in the claim 6, wherein said radiating point source comprises a transmitting dipole antenna.

8. A system as claimed in one of the claims 3, wherein said radiating point source radiates said radiation wave which comprises one of said acoustic wave and said ultrasonic wave, said system further comprising a radiating source unit which comprises said radiating point source, a high frequency oscillator, and a branching and feeding unit, said high frequency oscillator connected to said branching and feeding unit for producing a high frequency signal to supply said high frequency signal to said branching and feeding unit, said branching and feeding unit connected to said radiating point source and said hologram data collecting means for branching said high frequency signal from said high frequency oscillator and producing first and second high frequency signals to supply said first high frequency signal to said radiating point source and to supply said second high frequency signal, as a reference wave, to said hologram data collecting means;

said hologram data collecting means received said radiation wave and said reference wave for collecting hologram data in response to said radiation wave and said reference wave.

9. A system as claimed in the claim 8, wherein said hologram data collecting means comprises a two-dimensional array microphone.

* * * * *